(12) United States Patent
Hamm

(10) Patent No.: US 9,015,165 B1
(45) Date of Patent: Apr. 21, 2015

(54) TEXT-SQL RELATIONAL DATABASE

(71) Applicant: Michael L. Hamm, Villa Park, IL (US)

(72) Inventor: Michael L. Hamm, Villa Park, IL (US)

( * ) Notice: Subject to any disclaimer, the term of this patent is extended or adjusted under 35 U.S.C. 154(b) by 0 days.

(21) Appl. No.: 14/195,291

(22) Filed: Mar. 3, 2014

(51) Int. Cl.
*G06F 17/30* (2006.01)

(52) U.S. Cl.
CPC .............................. *G06F 17/30705* (2013.01)

(58) Field of Classification Search
CPC ................... G06F 17/30; G06F 17/00
See application file for complete search history.

(56) References Cited

U.S. PATENT DOCUMENTS

| | | | | |
|---|---|---|---|---|
| 4,575,795 | A * | 3/1986 | Boothroyd et al. | 712/225 |
| 4,881,075 | A * | 11/1989 | Weng | 341/87 |
| 4,931,928 | A * | 6/1990 | Greenfeld | 717/131 |
| 5,040,113 | A * | 8/1991 | Mickunas | 715/202 |
| 5,060,179 | A * | 10/1991 | Sharp | 708/271 |
| 5,072,452 | A * | 12/1991 | Brown et al. | 704/256.4 |
| 5,208,834 | A * | 5/1993 | Frederickson | 375/224 |
| 5,295,238 | A * | 3/1994 | Dickson | 345/471 |
| 5,469,354 | A * | 11/1995 | Hatakeyama et al. | 1/1 |
| 5,591,956 | A * | 1/1997 | Longacre et al. | 235/462.1 |
| 5,706,494 | A * | 1/1998 | Cochrane et al. | 1/1 |
| 5,721,900 | A * | 2/1998 | Banning et al. | 1/1 |
| 5,721,901 | A * | 2/1998 | Banning et al. | 1/1 |
| 5,724,457 | A * | 3/1998 | Fukushima | 382/311 |
| 5,752,016 | A * | 5/1998 | Whittaker et al. | 1/1 |
| 5,781,133 | A * | 7/1998 | Tsang | 341/59 |
| 5,815,830 | A * | 9/1998 | Anthony | 707/758 |
| 5,969,649 | A * | 10/1999 | Ashley et al. | 341/59 |
| 5,983,228 | A * | 11/1999 | Kobayashi et al. | 1/1 |
| 5,999,192 | A * | 12/1999 | Selfridge et al. | 345/440 |
| 6,012,067 | A * | 1/2000 | Sarkar | 1/1 |
| 6,016,497 | A * | 1/2000 | Suver | 1/1 |
| 6,016,546 | A * | 1/2000 | Kephart et al. | 726/24 |
| 6,052,072 | A * | 4/2000 | Tsang et al. | 341/59 |
| 6,134,597 | A * | 10/2000 | Rieth et al. | 709/237 |
| 6,212,516 | B1 * | 4/2001 | Kobayashi et al. | 1/1 |
| 6,240,430 | B1 * | 5/2001 | Deike et al. | 715/210 |
| 6,243,496 | B1 * | 6/2001 | Wilkinson | 382/245 |
| 6,253,194 | B1 * | 6/2001 | Johnson et al. | 1/1 |
| 6,307,488 | B1 * | 10/2001 | Cooper | 341/51 |

(Continued)

OTHER PUBLICATIONS

Sacks-Davis, Ron, Alan Kent, Kotagiri Ramamohanarao, James Thom, and Justin Zobel. "Atlas: A nested relational database system for text applications." Knowledge and Data Engineering, IEEE Transactions on 7, No. 3 (1995): 454-470.*

*Primary Examiner* — Farhan Syed

(74) *Attorney, Agent, or Firm* — Nicholas Pfeifer; Smith & Hopen, P.A.

(57) ABSTRACT

The present invention is a method and system for storing, retrieving, and updating data stored in a persistent Name/Value storage container. The system and method combine similar data into data strings using a programming language referred to as Text-SQL that separates and relates the data using delimiters. The data strings are further combined into groups of like data strings that are also organized using delimiters. These groups of data strings are assigned a name and stored in a Name/Value storage container with the value being the grouped data string. The present invention uses simple dot-notation to parse the data strings into specific detailed information, which may be accomplished through an application programming interface (Text-SQL API) that provides functions for updating, deleting, retrieving, and storing data. The API utilizes a standard syntax for use with Cookies, HTML5 sessionStorage, and HTML5 localStorage providing cross-browser functionality and simplified programming.

12 Claims, 10 Drawing Sheets

(56) References Cited

U.S. PATENT DOCUMENTS

| | | | |
|---|---|---|---|
| 6,345,101 B1* | 2/2002 | Shukla | 380/210 |
| 6,400,288 B1* | 6/2002 | Fredrickson et al. | 341/59 |
| 6,411,452 B1* | 6/2002 | Cloke | 360/51 |
| 6,434,554 B1* | 8/2002 | Asami et al. | 1/1 |
| 6,463,533 B1* | 10/2002 | Calamera et al. | 713/163 |
| 6,550,057 B1* | 4/2003 | Bowman-Amuah | 717/126 |
| 6,564,214 B1* | 5/2003 | Bhide | 1/1 |
| 6,581,052 B1* | 6/2003 | Slutz | 1/1 |
| 6,594,669 B2* | 7/2003 | Asami et al. | 1/1 |
| 6,826,558 B2* | 11/2004 | Slutz | 1/1 |
| 6,829,620 B2* | 12/2004 | Hsing et al. | 1/1 |
| 7,007,007 B2* | 2/2006 | Slutz | 707/809 |
| 7,478,081 B2* | 1/2009 | Hacigumus et al. | 1/1 |
| 7,680,862 B2* | 3/2010 | Chong et al. | 707/753 |
| 7,725,501 B1* | 5/2010 | Stillman et al. | 707/805 |
| 7,792,814 B2* | 9/2010 | Cohen | 707/707 |
| 8,001,128 B2* | 8/2011 | Hacigumus et al. | 707/741 |
| 8,135,948 B2* | 3/2012 | Shulman et al. | 713/153 |
| 8,484,236 B1* | 7/2013 | Andrews et al. | 707/763 |
| 8,510,335 B2* | 8/2013 | Mattsson et al. | 707/781 |
| 8,548,909 B1* | 10/2013 | Snow et al. | 705/42 |
| 8,626,749 B1* | 1/2014 | Trepetin et al. | 707/722 |
| 8,719,250 B2* | 5/2014 | Chong et al. | 707/713 |
| 8,719,252 B2* | 5/2014 | Miranker et al. | 707/713 |
| 2003/0078921 A1* | 4/2003 | Michael Hsing et al. | 707/4 |
| 2003/0135593 A1* | 7/2003 | Lee et al. | 709/223 |
| 2003/0191774 A1* | 10/2003 | Slutz | 707/102 |
| 2003/0217071 A1* | 11/2003 | Kobayashi et al. | 707/102 |
| 2005/0065948 A1* | 3/2005 | Slutz | 707/100 |
| 2005/0177589 A1* | 8/2005 | Venkatesh et al. | 707/102 |
| 2006/0235823 A1* | 10/2006 | Chong et al. | 707/1 |
| 2006/0235837 A1* | 10/2006 | Chong et al. | 707/4 |
| 2009/0029776 A1* | 1/2009 | Ruppert et al. | 463/42 |
| 2009/0313278 A1* | 12/2009 | DeWoolfson | 707/102 |
| 2010/0324927 A1* | 12/2010 | Tinsley | 705/2 |
| 2010/0325169 A1* | 12/2010 | Loh et al. | 707/803 |
| 2012/0102022 A1* | 4/2012 | Miranker et al. | 707/713 |
| 2013/0024418 A1* | 1/2013 | Sitrick et al. | 707/608 |
| 2013/0117324 A1* | 5/2013 | Greiner et al. | 707/793 |
| 2013/0246327 A1* | 9/2013 | Tabrizi | 706/50 |
| 2014/0136958 A1* | 5/2014 | Scattergood et al. | 715/236 |

* cited by examiner

Continue to FIG. 6B

TEXT-SQL RELATIONAL DATABASE

BACKGROUND OF THE INVENTION

1. Field of the Invention

This invention relates, generally, to the field of computing. More specifically, it relates to client-side data storage systems.

2. Brief Description of the Prior Art

Historically, persistent local storage has been one of the key factors in preventing Web applications from achieving an improved user experience typically associated with native client applications. Native applications have had the benefit of using a computer's operating system for storage and retrieval of application-specific data. Whereas, Web applications have traditionally used Cookies for client-side data storage.

There are four current options for client-side storage: Cookies, Web-storage (local and session), Web SQL Database, and IndexedDB. Each of the current available options in today's technology has its own specific shortcomings described in the next paragraphs.

Cookies typically store user identifying information on the user's browser as name-value pairs. The stored data corresponds with one or more URLs, such that when a user requests a URL, the Web browser automatically sends one or more cookies, along with the corresponding URL request, to the Web server. Cookies can be very useful for customizing web pages based on user-identified preferences. However, cookies contain many critical downsides, including: (1) cookies are included in HTTP requests, resulting in slow Web application performance associated with the unnecessary data transmission; (2) the HTTP requests transmit the data in an unencrypted format; (3) the storage capacity is limited to roughly 4 KB of data; and (4) are designed as very simple key/value persistent storage system having its own set of shortcomings as described below.

The HTML5 sessionStorage object is equivalent to the HTML5 localStorage object, except that it stores the data for only one session. In the HTML5 sessionStorage the data is deleted when the user closes the browser window. HTML5 localStorage and HTML5 sessionStorage are both a very simple key/value persistence storage system having their own set of shortcomings. All key/value storage systems have the following common shortcomings: (1) they cannot store structured data (only text strings), (2) cannot provide in-order retrieval of keys, (3) cannot efficiently search over-values, (4) cannot store duplicate keys, and (4) lack the ability to relate and correlate the information.

In addition, there is no query language or schemas, which affects the ability to scale where there is a need to impose organization on a larger data set. Furthermore, transactional safety is not a standard feature, which is an obvious issue now-a-days.

The Web SQL Database specification provides a thin wrapper around a SQL Database. The problem with the Web SQL Database specification is that it is not fully supported by all database vendors. Since Nov. 18, 2010, the W3C announced that Web SQL database is a deprecated specification. This is a recommendation for web developers to no longer use the technology as effectively, the spec will receive no new updates, and browser vendors are not encouraged to support the technology. Web SQL Database is basically SQLite (a flat file database) embedded into the Web browser. This option contains the usual problems associated with flat file database—high level of concurrency and missing features.

The IndexedDB API exposes an object store and uses an asynchronous API, which is a non-blocking system and, as such, will not receive data through return values. Rather, it will receive data delivered through to a defined callback function. IndexedDB is transactional in nature and only provides asynchronous transactions. It is not possible to perform any operation (read/write) outside of a transaction (both an object store and a transaction object needs to be created, specific to the object store, and as long as the object is alive, the operation can be perform on that object store. Furthermore, IndexedDB is not supported by all vendors.

An additional problem associated with all of the current technologies is the possibility of experiencing a race condition. A race condition is an undesirable situation that occurs when a device or system attempts to perform two or more operations at the same time, but because of the nature of the device or system, many of the operations must take part in the proper sequence (especially in maintaining state of objects) in order to be completed correctly. In order to overcome a race condition, it is essential that the system in many cases use synchronous transactions. However, synchronous transactions are often the cause of slow computing because of the often-arising need to transfer large amount of data. Therefore, it is crucial to improve transfer speeds and data size to prevent slow computing.

Accordingly, what is needed is a more efficient and easier method and system for client side persistent storage. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved client-side persistent storage system and method now met by a new, useful, and nonobvious invention.

The novel method and system include a non-transitory, tangible computer-readable media having computer-executable instructions for performing a method by running a software program on a computer, the computer operating under an operating system, the method including issuing instructions from the software program to store, update, and/or retrieve data in a data store. The instructions include establishing a data connection between a web browser client and a remote web server, receiving default data from the remote web server, and monitoring properties of the graphic user interface as modified by an end user accessing the web browser client. The instructions further include combining data, representing similar properties of the graphic user interface, into data strings using a programming language. The similar properties are predetermined and separated using delimiters. Then the program combines the data strings into a predetermined set of related data strings, referred to as groups. The group's structure is organized using group delimiters to keep the plurality of data strings individually accessible. The groups of data strings are then saved as a single concatenated string and the concatenated string is stored in a persistent Name/Value storage container. The name is a predetermined key representing the concatenated string and the value is the concatenated string.

The method and system further includes responding to selecting or retrieving, updating, deleting, and inserting actions. Responsive to a data selecting or retrieving action, the present invention accesses the specified Name/Value storage container containing some data to be retrieved, parses the concatenated string using simple dot-notation, selects the data from the concatenated string, and returns the specific data.

In response to a data updating action, the program accesses the Name/Value storage container containing the properties to be updated, and selects the properties from the concatenated string, using simple dot-notation to parse the concatenated string. The program then updates the properties in the concatenated string and saves the concatenated string in the Name/Value storage container.

Responsive to a data deleting action, the present invention accesses the specified Name/Value storage container containing the properties to be deleted. The desired properties are selected from the concatenated string, using simple dot-notation to parse the concatenated string and the properties are deleted. The concatenated string is saved without the deleted properties and stored in the Name/Value storage container.

Similarly to the foregoing actions, in response to an inserting action, the present invention accesses the Name/Value storage container, parses the concatenated string, inserts the data, re-saves the concatenated string with the inserted data, and re-stores the string in the Name/Value storage container.

In a certain embodiment, the present invention uploads properties to the web server in response to a predetermined event. The properties are related to an account authorized by the end user. In a certain embodiment, the present invention uses an application programming interface to encapsulate the programming language with functions using simple dot-notation declarative statements for performing particular operations. The functions of the application programming interface including a select function, an insert function, an update function, and a delete function, where each function has the same syntax for any Name/Value storage container.

In a certain embodiment the programming language includes an attribute delimited text string with an assigned field name to relate the attribute delimited text string, a field text string using delimiters separating the field values and field names, a field delimited text string referred to as a row, a single row delimited text string referred to as a table, and an assigned name to relate the table string.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
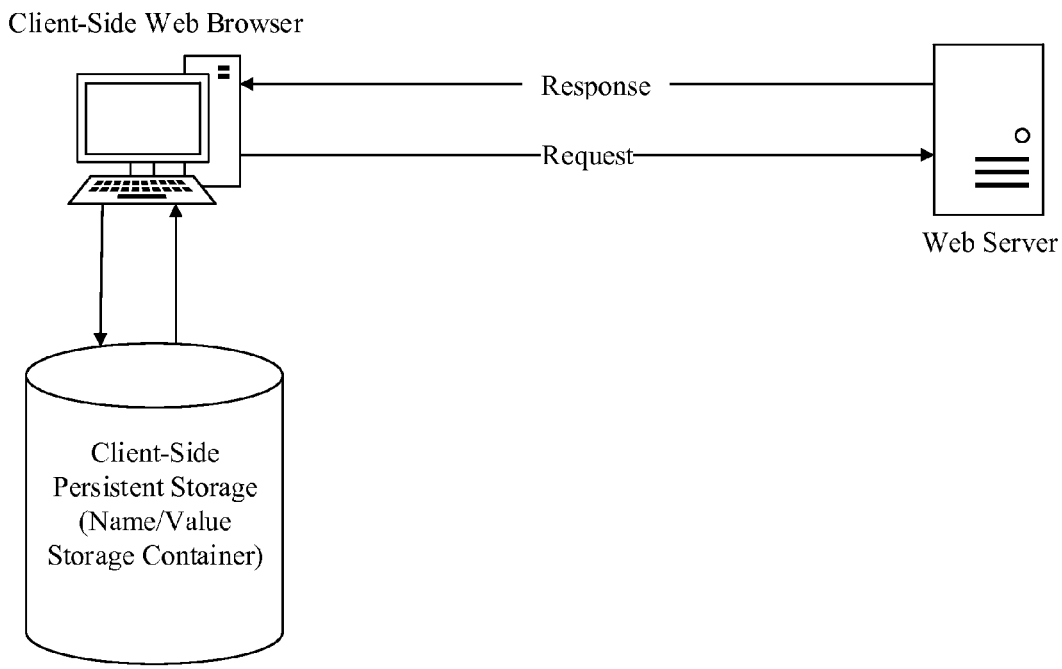
FIG. 1 is a schematic structural diagram of a Web browser communicating with a Web server and storing data in a client-side persistent Name/Value storage container.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

The present invention improves Client-side persistent storage by improving on the major downfalls of Web Storage. The present invention improves Web Storage by providing a structured querying language (SQL), providing schemas, and allows the developer the choice of asynchronous and synchronous transactions. The addition of the SQL and schemas improves organization, scaling, and functionality, while the management of asynchronous transactions prevents race conditions.

The present invention is a computer-based system and method for storing and accessing data on a novel relational text data structure (called a Relational Text Database) using a novel Structure Query Language (called Text-SQL) and a novel application programming interface (called Text-SQL API). The present invention transforms existing Name/Value storage containers into relational text databases using Text-SQL to querying, alter, and define a new relational text data structure. Existing Name/Value storage containers include but are not limited to, HTML5 localStorage, HTML5 sessionStorage, and Cookies. The Text-SQL API uses simple dot-notation declarative statements to access the Text-SQL language for querying, altering, and defining text strings in the relational text database. The present invention substantially improves the performance of client-side data storage and retrieval, but is also useful for server-side data storage and retrieval.

The present invention aggregates a plurality of values into a single key, minimizing the verbosity and inherent latency suffered by a one-to-one relationship between names and values as currently taught in the art. By analogy, the current state of the art teaches a book having a single sentence for each chapter. This requires unnecessary paging through the book to retrieve a small amount of information. In many cases, the name or index itself consumes a greater amount of resources than the value itself, which is the critical information component. In contrast, the present invention compresses the data and concatenates the text strings of data into a single text string.

Such a system and method of storing and retrieving data provides several benefits over the current technology. The benefits include an API providing intuitive minimal learning curve, encapsulation, less errors, and easier debugging. Compressing the data and concatenating the strings into a single string, using the Text-SQL language, allows for reduced read and write times, reduced read and write calls, increased quantity of stored data using less storage space, increased run-time speed, reduced development costs, and querying, altering, and defining data like a relational database. The system is an improvement over current technology because it is capable of compressing data by more than 80% thereby increasing storage by 5 times the current limitations. Moreover, the system is capable of storing structured data as a string, searching over-values, storing duplicate hierarchal keys, and relating and correlating data. Additional advantages over the prior art include operating without an additional specific object store, lack of a need for a defined callback function, no requirement of a transaction object to read or write, being cross browser compliant, and being unparticular to database vendors. Furthermore, the method does not require a server side component if the data store is on the client side or the method does not require a client side component if the data store is on the server side.

The present invention uses Text-SQL language to restructure data into a new relational text data structure. Rather than having hundreds of Name/Value pairs describing, for example the appearance, behaviors, layout, accessibility and miscellaneous properties of a window within a browser, the properties of the exemplary window are stored into a single string joined to other like strings (groups) by the delimiter "&" and saved as a single Name/Value pair. The "Name" is the key related to the "Value" ("Window" in this example) and the "Value" is the compressed and concatenated string making up the properties of all the windows. Information may be selected from this concatenated string using simple dot-notation to parse (string indexing) this concatenated string into specific detailed information, such as the individual property value of the individual "Window," as needed by the developer. This novel relational text data structure allows the rapid storage and retrieval of specific values on a local storage basis. The benefits are also substantial when saving state to a remote server because the data package is radically more compact. In a certain embodiment, the data is stored totally on the client and does not shuttle between the client and server on each request or response.

Text-SQL language is a novel structured query language for querying, altering, and defining a new relational structure for text strings to be stored in a Name/Value storage container, resulting in a new relational text database. One of the cons associated with Name/Value storage containers like HTML5 localStorage, sessionStorage and Cookies is the possibility of experiencing a race condition. A race condition is an undesirable situation that occurs when a device or system attempts to perform two or more operations at the same time, but because of the nature of the device or system, the operations must be performed in the proper sequence in order to be executed correctly. In order to overcome a race condition, it is essential that the system manage asynchronous and synchronous transactions. However, synchronous transactions are often the cause of slow computing because of the often-arising need to transfer large amount of data. Therefore, it is crucial to improve transfer speeds and data size to prevent slow computing. The Text-SQL language compresses the data and concatenates the data strings to increase computing speeds necessary to allow for fast computing with synchronous transaction.

Text-SQL language alters the structure of the data text strings by grouping fields of data together, into a row, to relate to each other and grouping rows together, into a table, to relate to each other. Delimiters separate the rows, pairs, field names and field values, and attribute values. The delimiters are preferably "&", ":", "=", and "|", respectively. The delimiters allow the strings to be joined and split (parsed), thereby creating relationships between groups of data while allowing the data to be significantly compressed.

For example, if we need to store a series of property values for a window labeled "welcome", Such as Top=10, Left=200, Width=375 and Height=315. By not storing the unit of measure "px" for each value we decrease the string size (aids in compression) and increases flexibility since the programmer may change the units of measurement dynamically and easily. This data is not relational. We would not know which window these dimensions belong. The current method is to store multiple Name/Value pairs in the storage container. A very simplified example would be:

Window.welcome.Top=10
Window.welcome.Left=200
Window.welcome.Width=375
Window.welcome.Height=315

The data is now related to the window named "welcome". The problem is that it will take four reads to the storage container to return this information. To reduce the reads to the storage container to one, the present invention compresses the data. The present invention performs the following tasks:

1. Creates an attribute delimited "|" string from the field values:

| Field Name | Field value |
| --- | --- |
| Top | =10 |
| Left | =200 |
| Width | =375 |
| Height | =315 |

Joins these attributes with the delimiter "|" creating the field value and assigns a field name "Data" to this field value such that Data=10|200|375|315.

2. Adds in the relational design:
   These are attributes belonging to the "welcome" window. A field name "Id" and field value "welcome" are added to relate this information and is join with the ":" delimiter to create a row representing an individual window in this example.
   Id=welcome:Data10|200|375|315
3. If there are more windows to add such as a window named "Introduction", each of the window strings are joined with the delimiter "&" creating one concatenated string such that
   Id=introduction:Data=100|200|300|400&Id=welcome: Data=10|200|375|315
4. The concatenated string is saved to the select storage container, for example HTML5 localStorage, with the name "Window" and the Name/Value pair would be as follows:
   Name Value
   Window Id=intro:Data=100|200|300|400&Id=welcome: Data=10|200|375|315
   Returning the same information now requires only a single read:
   dDOS.Store.Select('Local.Window.welcome.Data')
   Resulting in the return: 10|200|375|315
   Moving this window saves the new location (top=0px and left=0px) as follows
   dDOS.Store.Update('Local.Window.welcome.Data', '0|0|375|315')
   There is only one write, not four. To move the window to the right 100px would result in (left=100px)
   dDOS.Store.Update('Local.Window.welcome.Data.1', '100')

To further elaborate, a table may be a domObject such as domDesktop, domMenu, domToolbar, domShortcut, domWindow, domTaskbar, or domHelp. A row may be a specific domObject with the first field name "Id" being the Id of the domObject, such as the "welcome" window in a domWindow table. A field name may be the Id or any data needed by the developer. A field value is be the value of the associated field name and may be a "|" delimited string defining the domObjects attributes.

As another example, consider the querying of data, where the data is a person's name and the corresponding person's profession. The data could include: Jim is a builder, Jane is a laborer, John is a laborer, Joe is an owner, and Julie is a designer. Text-SQL language allows the data to be related as a table having five rows of people with an Id for each row. For example:
   People "Table"
      "Row" with Id=Jim:Type=Builder (more fields may exist . . . )
      "Row" with Id=Jane:Type=Laborer (more fields may exist . . . )
      "Row" with Id=John:Type=Laborer (more fields may exist . . . )
      "Row" with Id=Joe:Type=Owner (more fields may exist . . . )
      "Row" with Id=Julie:Type=Drafter (more fields may exist . . . )
   The text string would be as follows with the Name/Value pair:
      The name is "People" and the value is "Id=Jim:Type=Builder&Id=Jane: Type=Laborer&Id=John:Type=Laborer&Id=Joe: Type=Owner&Id=Julie:Type=Drafter&". The string can be split with the delimiter "&" to get the five rows shown above and a row can be split with the string delimiter ":" to get the field name value pairs made up of field names and associated field values.

The novel relational text database (RTD) is any Name/Value pair storage container that can respond to queries formatted in the Text-SQL language. The RTD is achieved by using the Text-SQL language to re-define the data structure into a new relational text data structure. The RTD preferably uses an existing storage container, like HTML5 localStorage, HTML5 sessionStorage, or Cookies, that stores text strings by a key (also referred to as a name) and stores the text string as the value. Using existing storage containers allows the system to be easily integrated into existing technology, cross-browser compatibility, and supported by W3C and all new browsers.

In the RTD, there exist only strings of data. Using Text-SQL language, the strings are joined and split (parsed) with delimiters, thus creating relationships and defining the data text string structure. The RTD is also accessible using the Text-SQL API. There are no objects like tables, rows, or columns. Everything is simply a text string.

Conceptually, the RTD will first point to a storage container, like HTML5 localStorage, sessionStorage, or Cookies. For example the table="Window" is a concatenated and compressed string where each row is the data for each individual window. In the Name/Value pair, a table is the text string stored in the value and found using a specific key or name. In the Name/Value pair, the name or key represents the name of the group (table) of like objects, in this example "Window". The value is the compressed and concatenated string joining all the windows with the delimiter "&". Table(s) is a text strings and can be split into rows by the delimiter "&". These rows are text strings. Row(s) can be split into field name value pairs by the delimiter ":". These field name value pairs are text strings and the first field is "Id". The value in the "Id" field represents the name of the row, an individual window in this example. Field name value pairs are text strings and can be split into field names and field values by the delimiter "=". The field value is a text string that can be split into attributes by the delimiter "|". These attributes are text strings and are typically accessed by ordinal positions. This conceptual view is the logic behind the system, by parsing and looping we can query, alter, and define the data text string's structure.

The Text-SQL API simplifies the access to the Text-SQL Language to query, alter, and define the RTD. The Text-SQL API uses simple dot-notation declarative statements to access the Text-SQL language. HTML5 localStorage, HTML5 sessionStorage, and Cookies are accessed with different coding. The Text-SQL API simplifies the programming for the developer by encapsulating the Text-SQL code with functions using simple dot-notation declarative statements. The functions have the same syntax regardless of the storage container that is used. This substantial increase in consistency further simplifies the underlying complicated programming. For example to access a particular container the Text-SQL function syntax would be as follows:
   dDOS.Store.Select('Local.Window.welcome') to access HTML5 localStorage
   dDOS.Store.Select('Session.Window.welcome') to access HTML5 sessionStorage
   dDOS.Store.Select('Cookie.Window.welcome') to access a Cookie The design of the Text-SQL API offers simple-to-use, standardized methods for performing particular operations on its data, while encapsulating/concealing the specifics of how those tasks are accomplished. This assists in reducing errors since the most common sources of errors in programs is when one part of the system accidentally interferes with another part. The design provides simple dot-notation for querying, altering, and defining to reduce the read and writes to a single call. The dot-notation reduces the programmers' learning curve and simplifies direct access to the data stored in the Text-SQL Relational Database. Programmers are very familiar with simple dot-notation, which provides a shortcut for creating hierarchy, invoking methods, and setting or querying attribute values. Using simple dot-notation reduces typing, makes programs easier to read, eases maintenance, and uses encapsulation and information hiding.

The Text-SQL API is an improvement over the current Name/Value pair web storage offered by the newest HTML5. The syntax, shown below, is the same across all three Name/Value pair web storage containers—HTML5 localStorage, HTML5 sessionStorage and Cookies. The preferred embodiment has only four functions—Select, Insert, Update, and Delete. The form of those functions are:

dDOS.Store.Select(Name);
dDOS.Store.Insert(Name,Value);
dDOS.Store.Update(Name,Value); and
dDOS.Store.Delete(Name);

Where the "Name" is defined as ("Database.Table.Row.Field.OrdinalPosition"), "Database" is the pointer to the storage container, "Table" is the name of the group of like items, and "Row" is the individual items. This produces the ability to relate and correlate the data. Field name value pairs are the data being stored and attributes are typically property values stored by ordinal position in the field value.

The Select function allows the developer to query data in a Text-SQL Relational Database and return specific data. The objective is to return the specific information in one read, which is much faster than current methods. For example, selecting the "welcome" window is achieved by dDOS.Store.Select('Local.Window.welcome'). In another example, dDOS.Store.Select('Local.Window.welcome.Data.2'), "dDOS" is the domDesktop Operating System, "Store" is the naming space or system to access the Text-SQL API, "Select" is the function to be performed, "Local" is the pointer to the storage container HTML5 LocalStorage, "Window" is the table (group of like items), "welcome" is the row, with the field name being "Data" and the field value being a "|" delimited list of attributes where the ordinal position is 2. In this example, the domDesktop Operating System (dDOS) accesses the storage system using Text-SQL API to execute the specified function on the selected storage container, which is HTML5 localStorage in this example. The information in the table named "Window", in the row named "welcome", with the field name "Data" and the attribute in ordinal position 2 is queried and returned.

Querying Examples

To get the entire table named "Browser" from localStorage, the function dDOS.Store.Select('Local.Browser') is used to return the data string:

Id≡SchemaData:MousePosition≡0:BrowserWidth1:
BrowserHeight≡2:BrowserViewWidth≡3:
BrowserViewHeight≡4&Id≡Default:
Data|508|514|508|514&

To retrieve the default row in the "Browser" table, the function is dDOS.Store.Select('Local.Browser.Default), which returns the data string:

IdDefault:Data|508|514|508|514

The function used to select the SchemeData for the ordinal positions in the field value, with the field name "Data", in the "Default" row, and in the "Browser" table is dDOS.Store.Select('Local.Browser.SchemaData'). The function returns the data string:

Id≡SchemaData:MousePosition≡0:BrowserWidth≡1:
BrowserHeight≡2:BrowserViewWidth≡3:BrowserViewHeight≡4

The function to select an ordinal position of a field value by field name "Data" in the "Default" row in the "Browser" table is dDOS.Store.Select('Local.Browser.SchemaData.BrowserWidth') and returns the data string: 1

The function dDOS.Store.Select ('Local.Browser.Default.Data.2') is used to select an attribute by ordinal position "1" in the field value by the field name "Data" in the "Default" row in the "Browser" table. The returned data string is: 508

To select an attribute by ordinal position "1" in the field value by attribute name "BrowserWidth" in the "Default" row in the "Browser" table, two Text-SQL API functions would be nested, yielding dDOS.Store.Select('Local.Browser.Default.Data.'+dDOS.Store.Select('Local.Browser.SchemaData.BrowserWidth')). The returned data string would be: 508

The Select function dDOS.Store.Select ('Local.Window.welcome.Data.2'); can be broken down to further illustrate the organization of the code. The Value is 'Local.Window.welcome.Data.2' in this example can be broken down into:

| Variable | Example Values | Constraints | Delimiters |
| --- | --- | --- | --- |
| _Database | = 'Local' | Pointer to Database | |
| _Table | = 'Window' | _Depth = 1 | '&' |
| _Row | = "welcome" | _Depth = 2 | ':' |
| _Field | = 'Data' | _Depth = 3 | '=' |
| _AttributePosition | = '2' | _Depth = 4 | '|' |

Comparison to Existing Systems and Methods

The comparison uses the "Welcome" window object states as an example for comparing the existing method and method described as the present invention. Under the existing method, the data stored in the localStorage or sessionStorage is shown below:

Window.welcome.Group=Welcome
Window.welcome.Type=Window
Window.welcome.Text=Welcome
Window.welcome.Image=app icj
Window.welcome.Visible=0
Window.welcome.Top=−1
Window.welcome.Left=200
Window.welcome.Width=375
Window.welcome.MinWidth=50
Window.welcome.Height=315
Window.welcome.MinHeight=100
Window.welcome.Zindex=200000
Window.welcome.Display=1
Window.welcome.IsModal=0
Window.welcome.IsClosable=1
Window.welcome.IsDraggable=1
Window.welcome.IsSizable=1
Window.welcome.IsMinimizable=1
Window.welcome.IsMaximizable=1
Window.welcome.EnableHelp=1
Window.welcome.EnableMenu=1
Window.welcome.EnableTaskbar=1
Window.welcome.EnableShortcut=1
Window.welcome.EnableProperties=0
Window.welcome.Authentication=0
Window.welcome.Location=Not Available
Window.welcome.Version=4.0
Window.welcome.Created=01/11/2014 11:21:43 AM Window.welcome.Modified=01/11/2014 11:21:43 AM
Window.welcome.Accessed=01/11/2014 11:21:43 AM Under the present invention, the same data stored in the localStorage or sessionStorage is shown below:

Id=welcome:Data=Welcome|Window|Welcome|app icj|0|115|351|375|50|315|100|200000|1|0|1|1|1|1|1|1|1|1|1|1|0|0|Not Available|4.0|1389457303942|1389457303942|1389457303942&

There are 868 characters and 30 calls to the disk under the existing method. There are 163 characters and 1 call to the disk under the method of the present invention. That equates to 81.2% improvement in character count and 96.7% improvement in calls to the disk. Obviously, the reduction in the data string's size by 705 characters reduces the read and write times. The present invention improves both the number of read and writes as well as the size of each read and write, making the system much faster than existing methods.

In addition, reading objects is considerably faster than reading persistent storage. The downside is that objects are not persistent. Therefore the present invention uses the Text-SQL API to read and write to the RTD (persistent storage: localStorage, sessionStorage or cookies) and then loads objects in memory with simple dot-notation. This reduces the number of reads to persistent storage to a single read. As an example, when a user drags a window, only the top mouse coordinates are stored in memory using the Text-SQL API and only one write will be needed when the user stops dragging the window. The window could be dragged from one side of a browser to the other, totaling 1,000 pixels, which would traditionally require 1,000 reads and writes. The present invention reduces the number of reads of the drag operation from 1,000 to 1 and reduces the number of writes from 1,000 to 1. Resulting in 2,000−2=1,998 or a 99.9% improvement in individual read and write transactions.

Examples of the Present Invention

Figure 2:
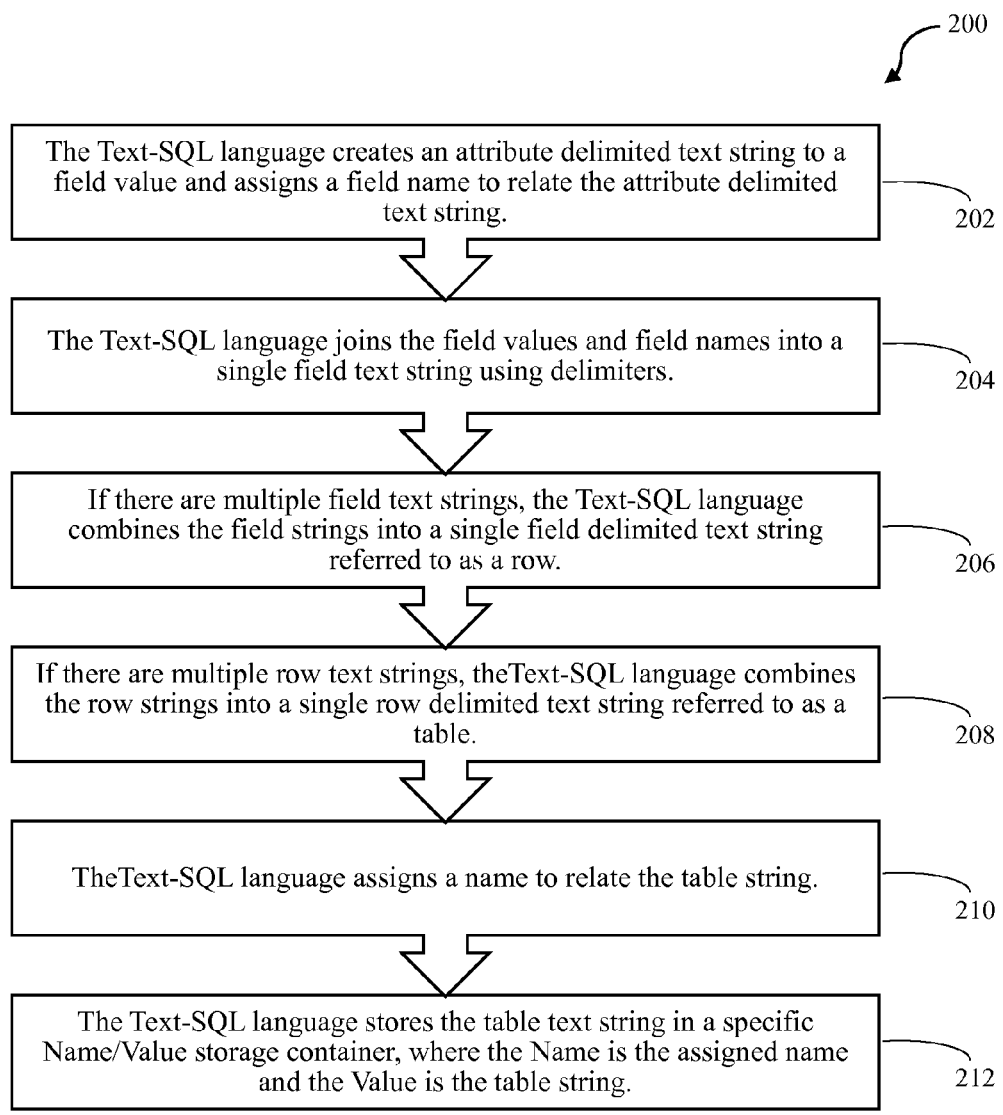
FIG. 2 is a flowchart of a certain embodiment of the data compression, parsing, and text string concatenation performed by the Text-SQL Language.

As shown in FIG. 1, the present invention allows a client-side Web browser to store and retrieve data in a Name/Value storage container without having to communicate with the Web server. As shown in FIG. 2, in a certain embodiment, generally denoted as reference numeral 200, the Text-SQL Language restructures data by creating an attribute delimited text string to a field value and assigning a field name to relate the attribute delimited text string (step 202). The Text-SQL language also joins the field names and associated field values into a field name value pair text string using delimiters (step 204). If there are multiple field name value pair text strings, the Text-SQL language combines the field name value pair text strings into a single field delimited text string referred to as a row (step 206). If there are multiple row text strings, the Text-SQL language combines the row strings into a single row delimited text string referred to as a table (step 208). The Text-SQL language assigns a name to relate the table string (step 210). Finally, the table text string is stored in a specific Name/Value storage container, where the name is an assigned name and the value is the table string (step 212).

Figure 3A:
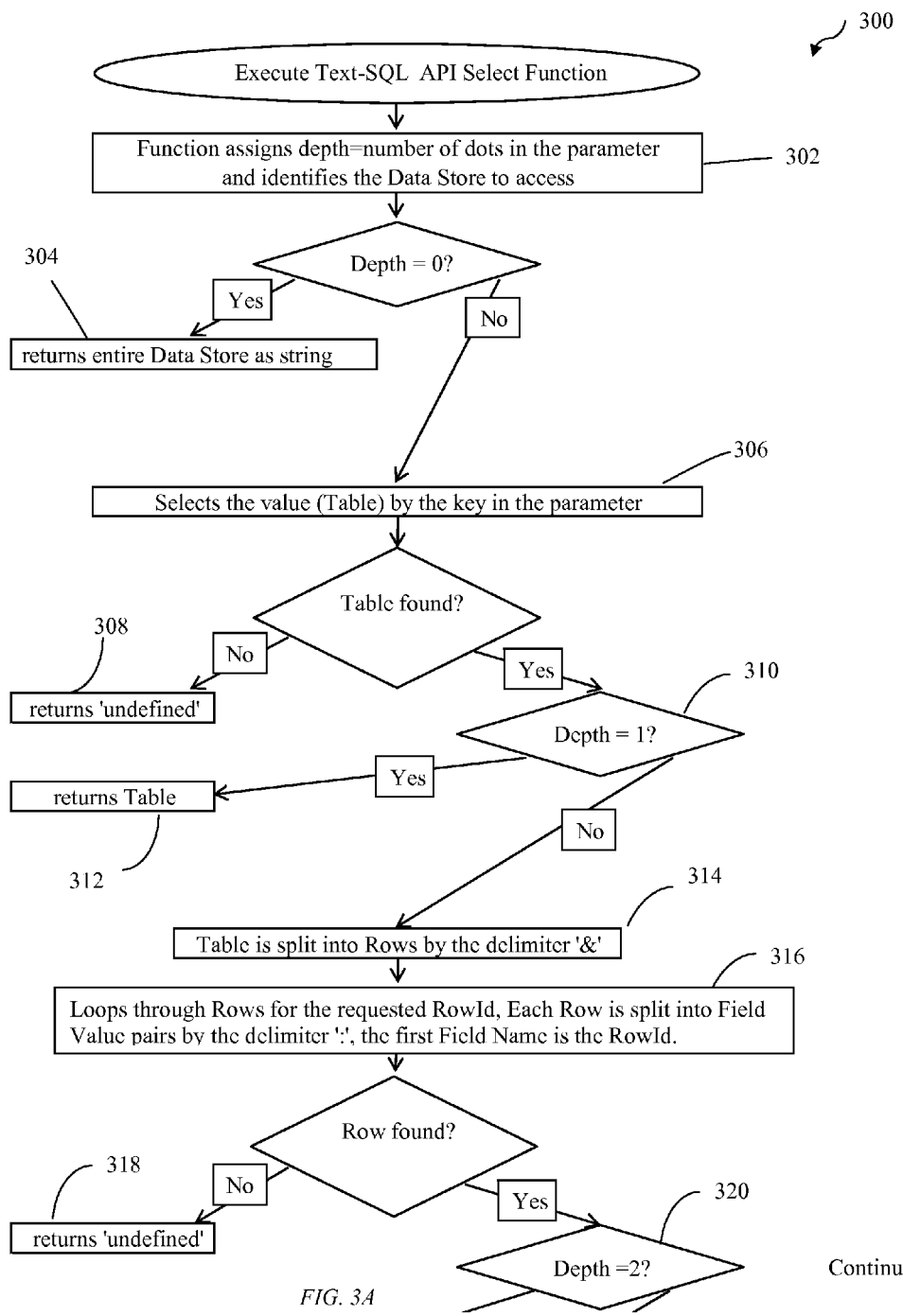
FIG. 3A is a flowchart of a certain embodiment of the Text-SQL API Select function.
Figure 3B:
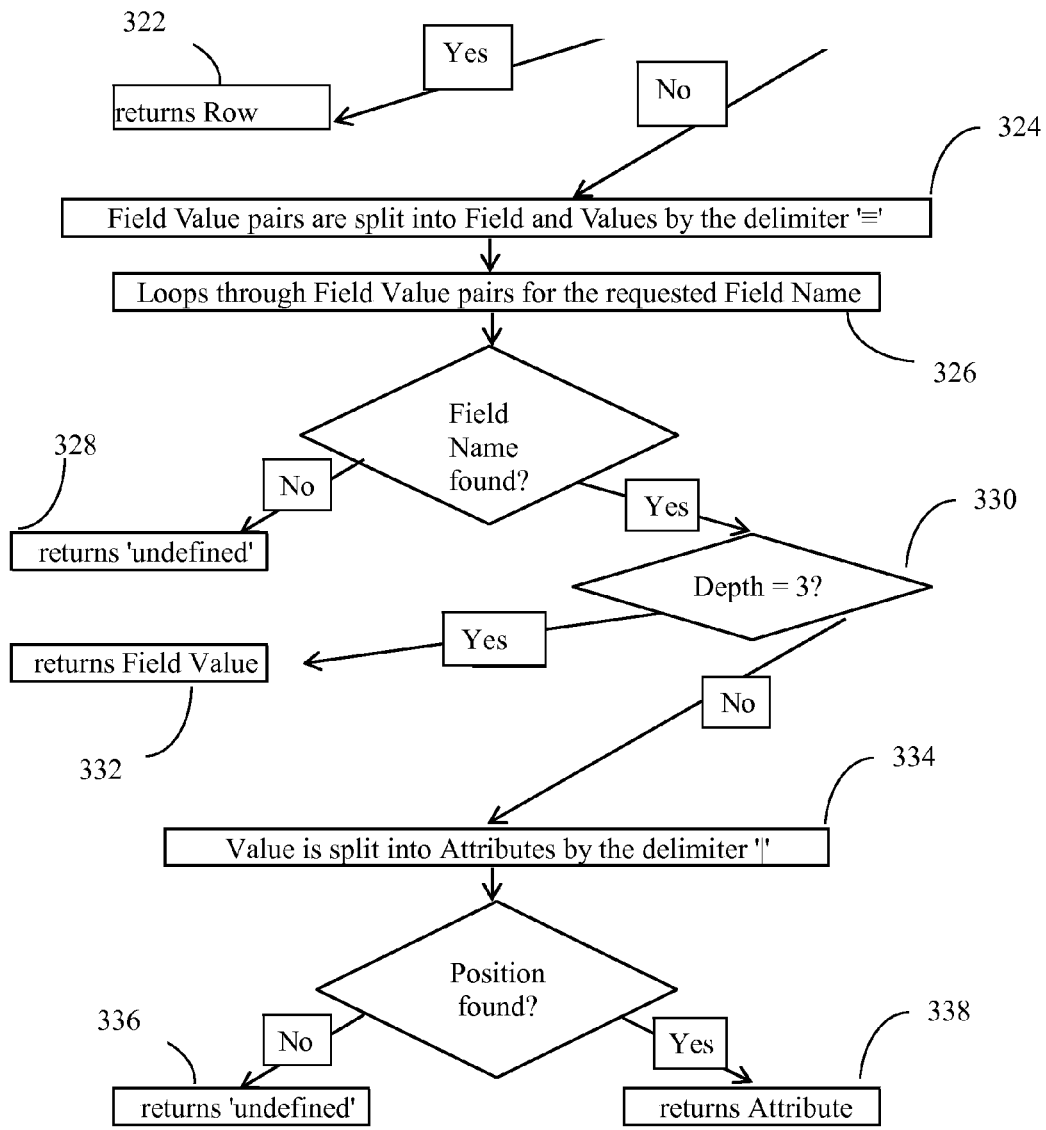
FIG. 3B is a continuation flowchart of the Text-SQL API Select function embodiment in FIG. 3A.

As shown in FIGS. 3A and 3B, a certain embodiment of the Text-SQL API Select function, generally denoted by reference numeral 300, will identify the data store to be accessed while also counting the number of dots in the dot-notation found in the parameter (step 302), after the function has been executed. A parameter is a variable declared in the declaration of a function. For example, "Name" is the parameter in dDOS.Store.Select(Name). Additionally in step 302, the function assigns a depth equal to the number of depth.

If the depth=0, the function returns the entire data store as a string (step 304). If the depth >0, the function searches the names stored in the identified data store and selects the value (table) by the key in the parameter (step 306). If the name is not found, the function returns "undefined" (step 308). However, if the name is found, the function looks to see if the depth=1 (step 310). For a depth=1, the function returns the selected table (step 312). For a depth >1, the selected table is split into rows by the delimiter "&" (step 314) and the function loops through the rows in the table searching for the requested RowId (Step 316). The first field name is the RowId. If the row is not found, the function returns "undefined" (Step 318). If the requested row is found, the function looks to see if the depth=2 (step 320). The row is returned for a depth=2 (step 322). When the depth >2, the field name value pairs are split into field names and associated field values by the delimiter "=" (step 324) and the function loops through field names searching for the requested field name. "Undefined" is returned if the field name is not found (step 328). The depth is checked if the field name is found (step 330) and the field value is returned if the depth=3 (step 332). For a depth >3, the value is split into attributes by the delimiter'|' (step 334) and the function searches for the selected attribute (or position). The function returns "undefined" if the position is not found (step 336) or returns the attribute if the attribute is found (step 338).

Figure 4A:
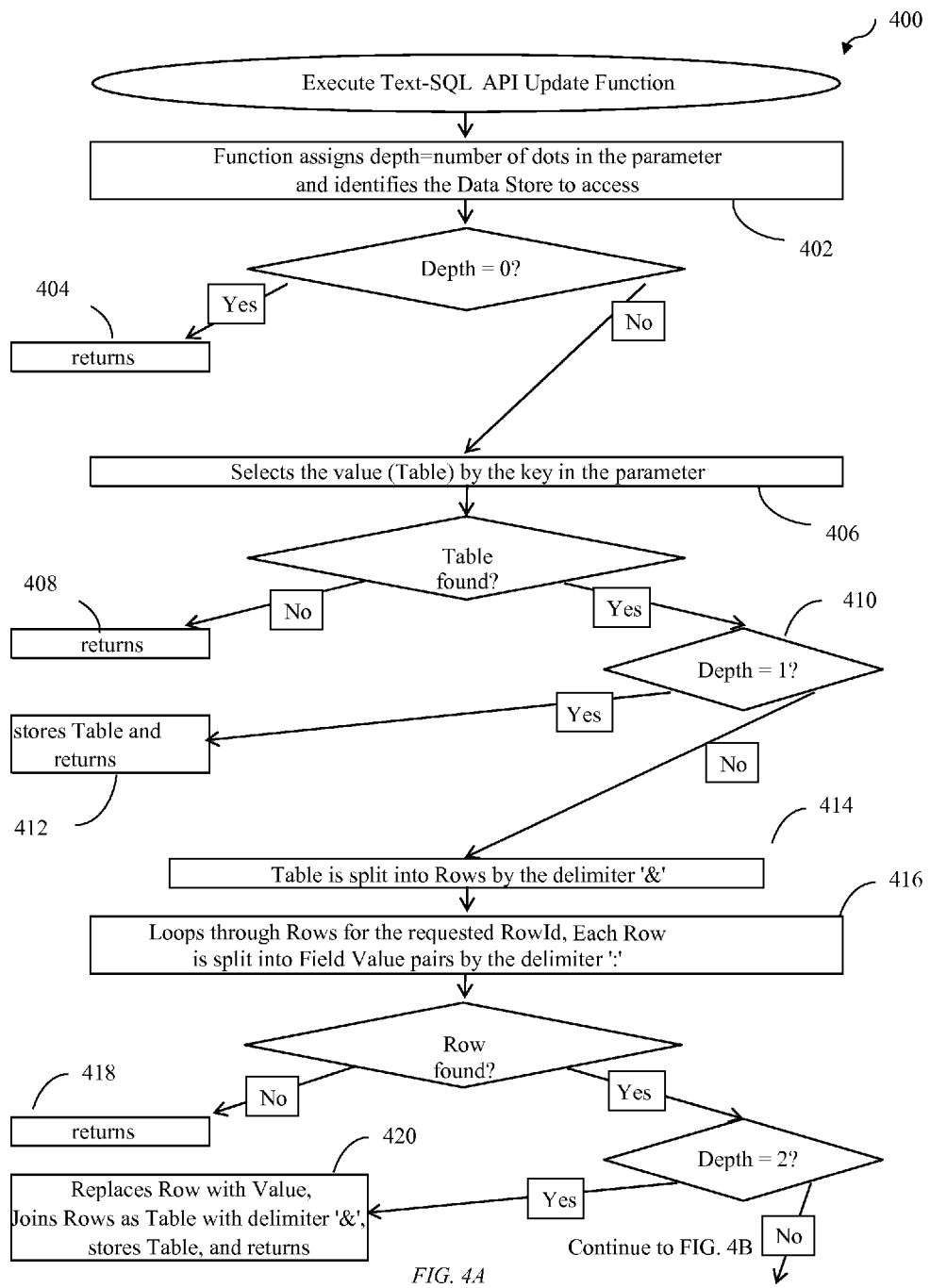
FIG. 4A is a flowchart of a certain embodiment of the Text-SQL API Update function.
Figure 4B:
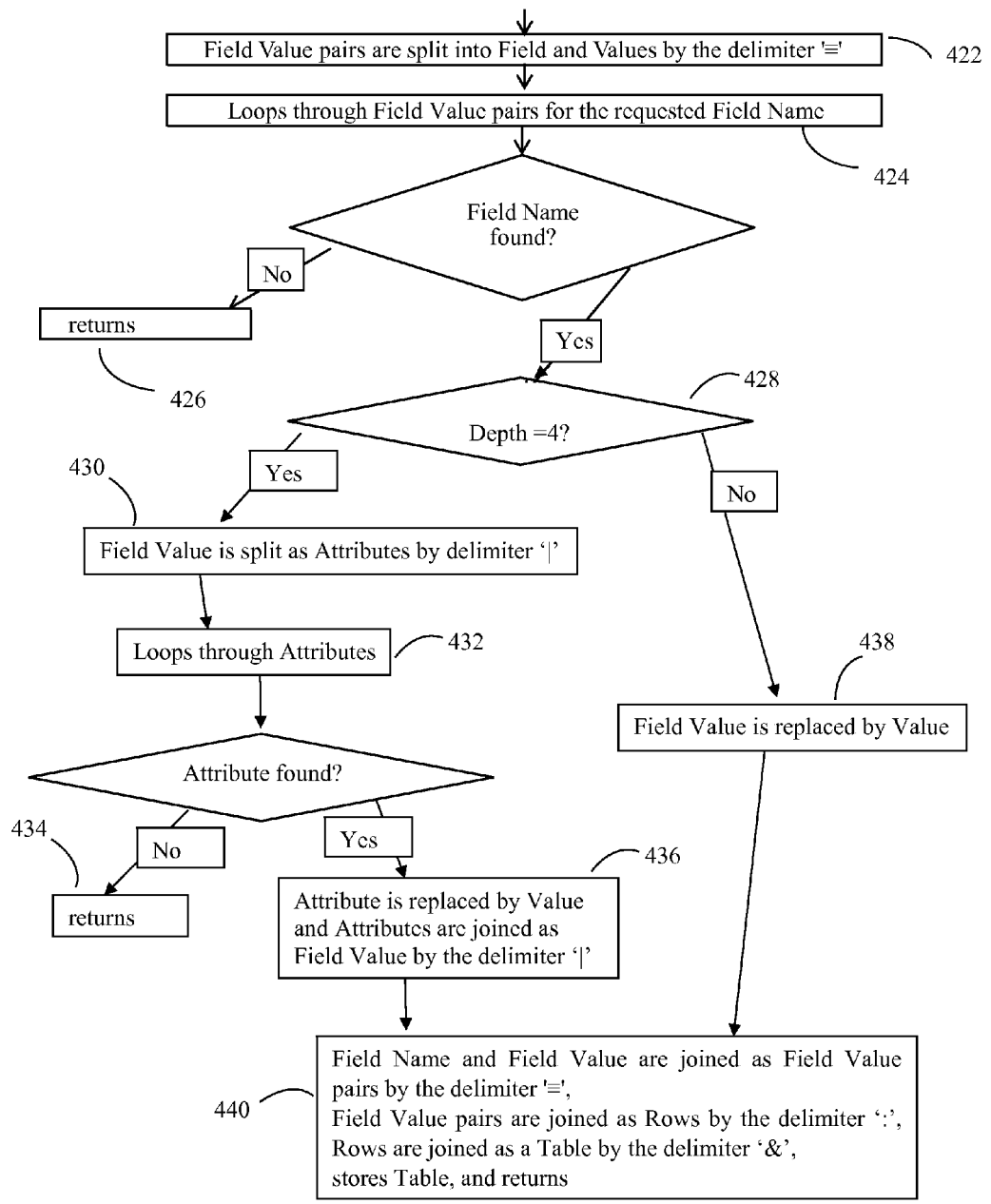
FIG. 4B is a continuation flowchart of the Text-SQL API Update function embodiment in FIG. 4A.

FIGS. 4A and 4B illustrate a certain embodiment of the Text-SQL API Update function, generally denoted by reference numeral 400. Once the update function is executed, the function identifies the data store to be accessed, counts the number of dots, and assigns a depth equal to the number of dots in the parameter (step 402). When the depth=0, the function returns (step 404) and when the depth >0, the function selects the value (or table) by the key in the parameter (step 406). If the table is not found, the function returns (step 408). However, if the name is found, the function looks to see if the depth=1 (step 410). When the table is found and the depth=1, the function stores the table and returns (step 412). When the depth >1, the table is split into rows by the delimiter '&' (step 414) and the function loops through rows searching for the requested RowId (step 416). Similar to the select function, the first field name is the RowId.

The function returns if the row is not found (step 418). Alternately, if the row is found and the depth=2, the function replaces the row with the value, joins row into a table with delimiter "&", stores the table, and returns (step 420). If the row is found, but the depth >2, the field name value pairs are split into field names and associated field values by the delimiter "=" (step 422). The function then loops through the field name value pairs searching for the requested field name (step 424). If the field name is not found the function returns (step 426). The depth is checked if the field name is found (step 428). If the depth=4, the field value is split into attributes by the delimiter "|" (step 430) and the function searches for the selected attribute (or position) (step 432). The function returns "undefined" if the position/attribute is not found (step 434). If the position/attribute is found, the attribute is replaced by the value and the attributes are joined as field value by the delimiter "|" (step 436). If the depth is not 4, the field value is replaced by the value (step 438). Field name and value are then joined as field name value pairs by the delimiter "=", the field name value pairs are joined to the row with delimiter ":", the row is joined to the table with delimiter "&", the table is stored, and the function returns (step 440).

Figure 5A:
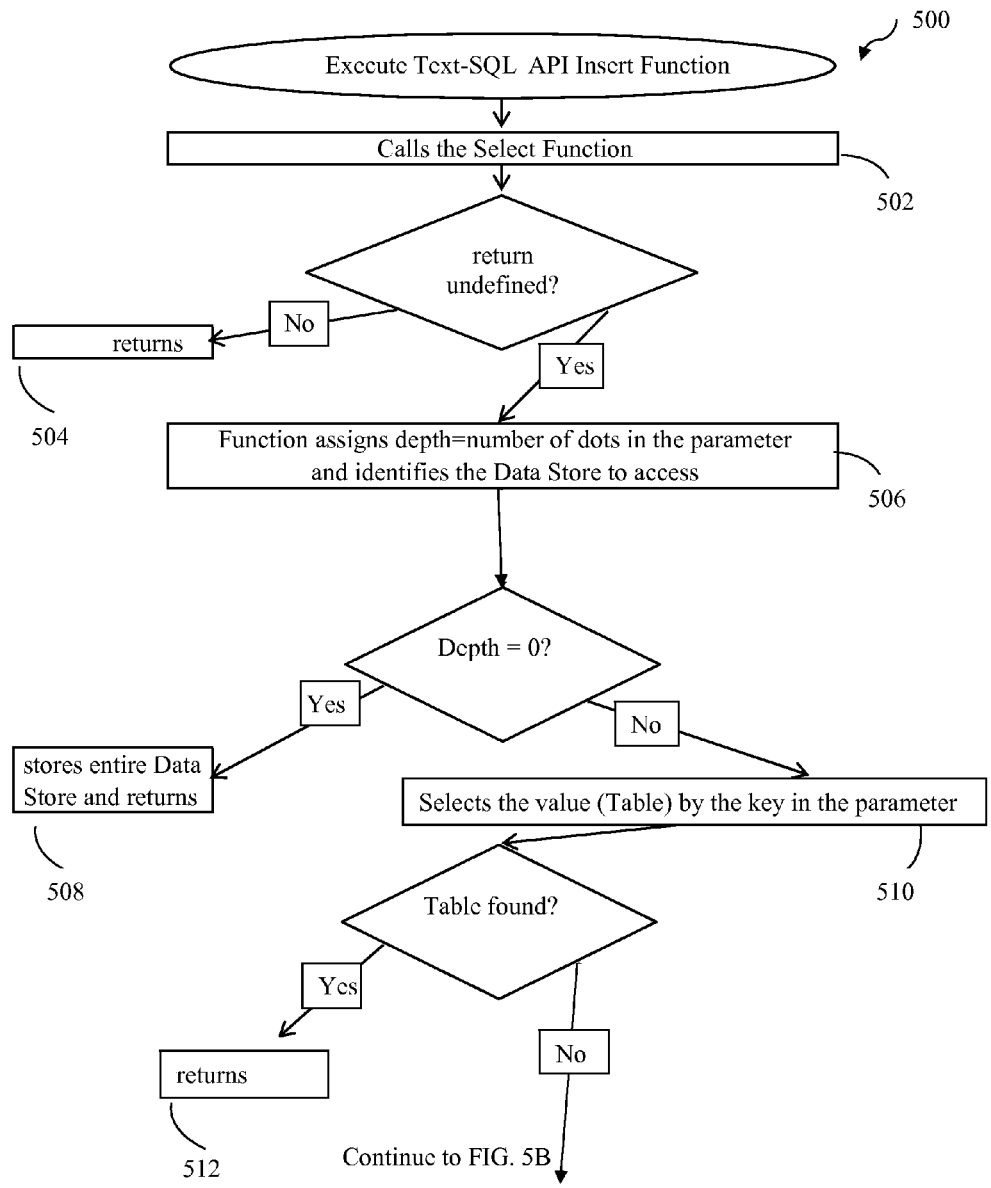
FIG. 5A is a flowchart of a certain embodiment of the Text-SQL API Insert function.
Figure 5B:
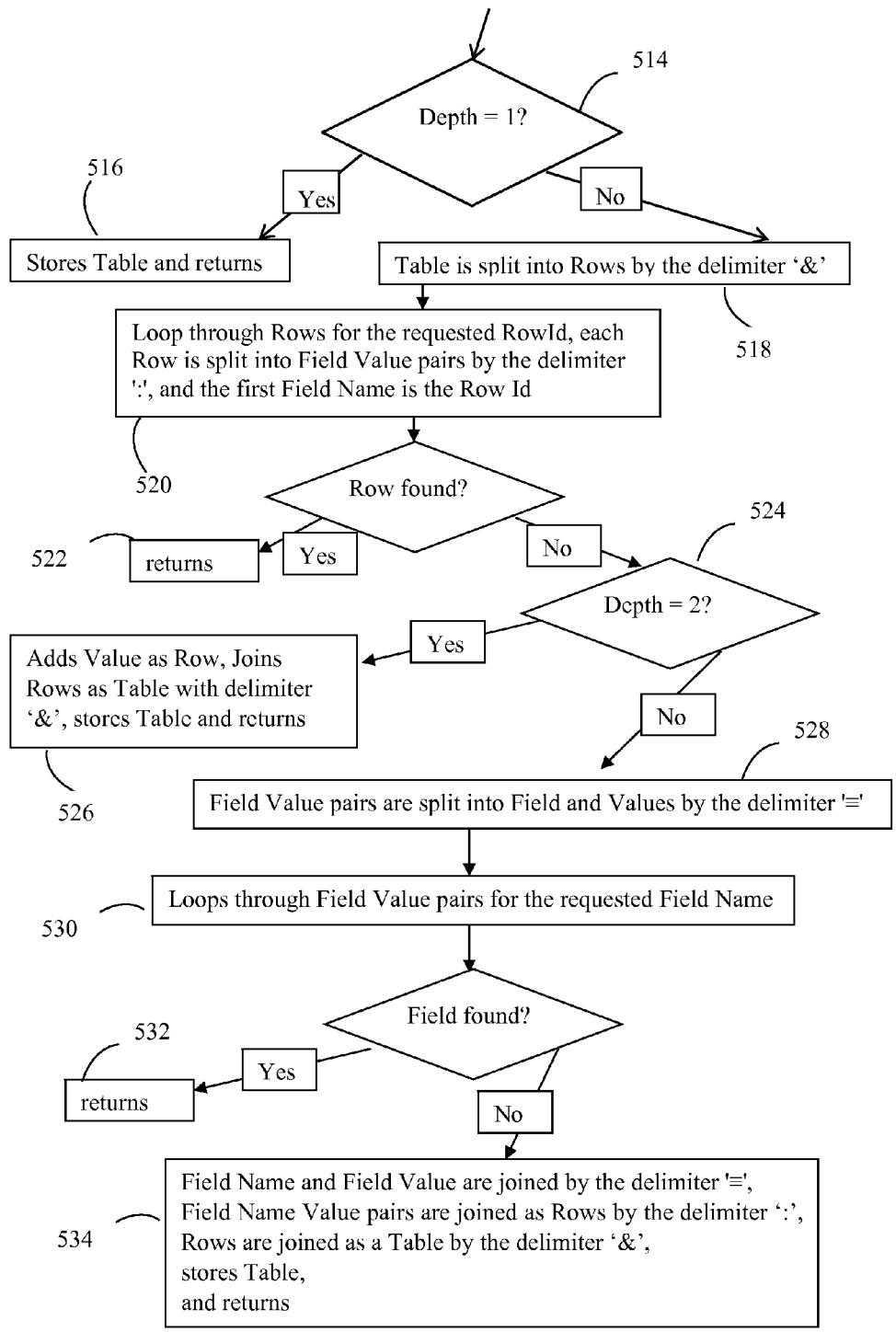
FIG. 5B is a continuation flowchart of the Text-SQL API Insert function embodiment in FIG. 5A.

A certain embodiment of the Text-SQL API insert function, as shown in FIGS. 5A and 5B, is generally denoted by reference numeral 500. The insert function calls the select function (step 502) when executed. If the select function is not undefined, the function returns (step 504) and if the select function is returned, the insert function identifies the data store to be accessed and the number of dots (or depth) in the parameter (step 506). If the depth=0, then the function stores the entire data store from the default (step 508). If the depth >0, the function searches the names stored in the identified data store and selects the value (table) by the key in the parameter (step 510). If the table is found, the function returns (step 512). However, if the name is not found, the function looks to see if the depth=1 (step 514).

The Table is stored (inserted) and the function returns (step 516). For a depth >1, the selected table is split into rows by the delimiter "&" (step 518) and the function loops through the rows in the table searching for the requested RowId (step 520). If the row is found, the function returns "undefined" (step 522). If the requested row is not found, the function looks to see if the depth=2 (step 524). When the row value is not found, the row is joined to the table with delimiter "&", the new table is stored, and the function returns (step 526).

For a depth >2, the field value pairs are split into field names and associated field values by the delimiter '=' (step 528) and the function loops through field values pairs looking for the requested field name. (step 530). If the field name is found undefined is returned (step 532). If the field name is not found, field name and value are joined as field name value pairs by the delimiter "=". The field name value pairs are joined to the row with delimiter ":", the new row is joined to the table with delimiter "&", the new table is stored, and the function returns (step 534).

Figure 6A:
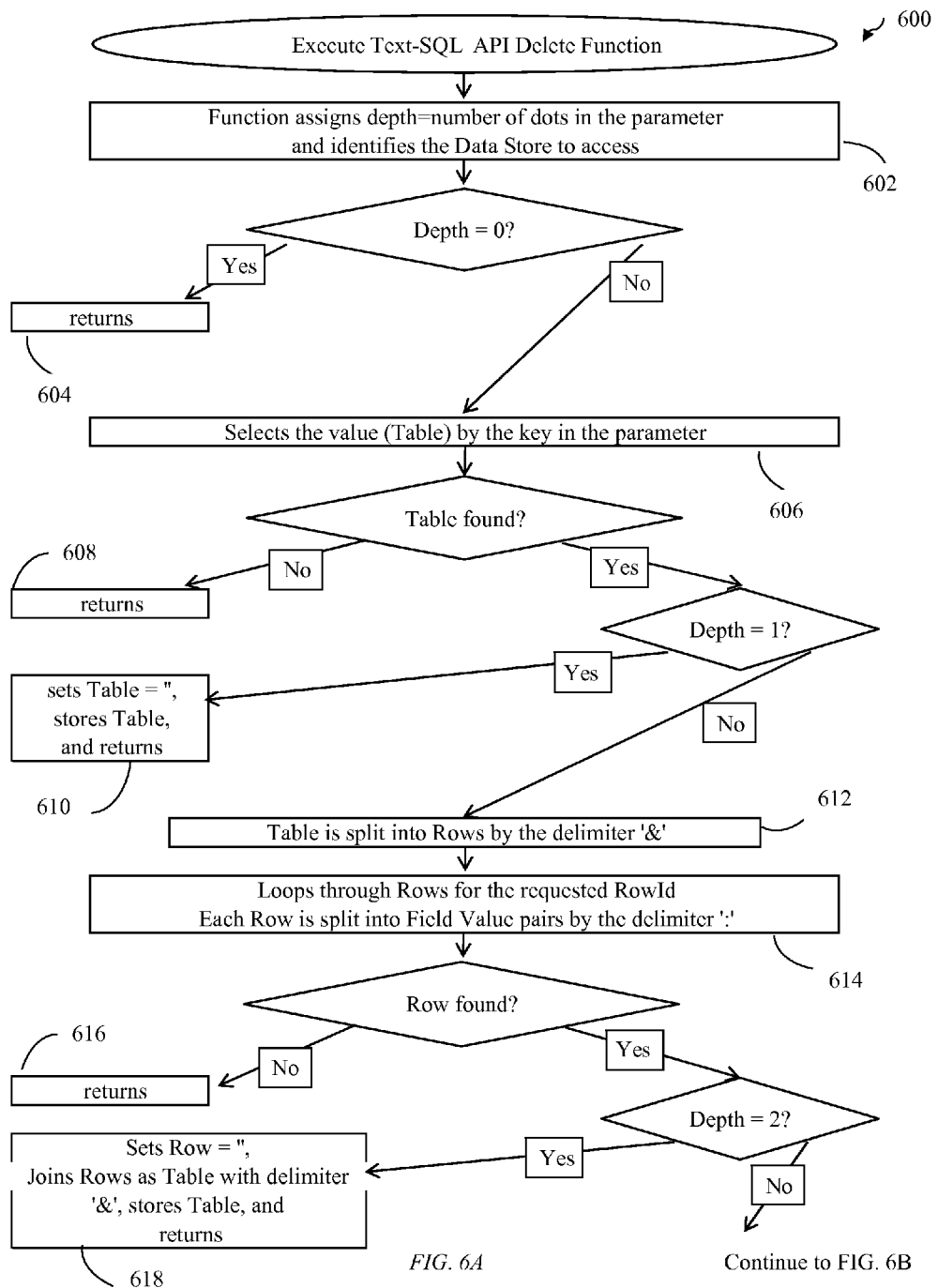
FIG. 6A is a flowchart of a certain embodiment of the Text-SQL API Delete function.
Figure 6B:
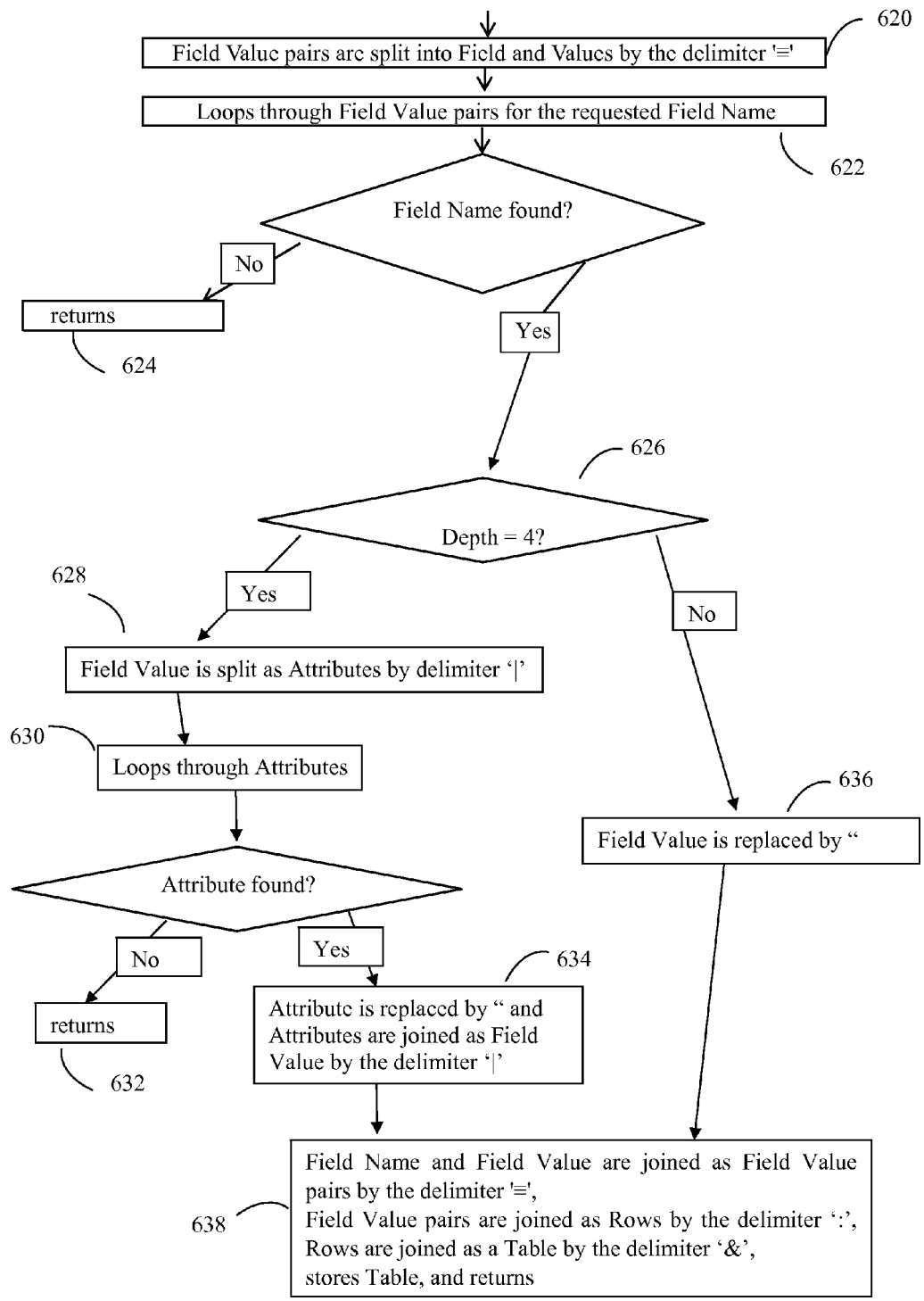
FIG. 6B is a continuation flowchart of the Text-SQL API Delete function embodiment in FIG. 6A.

A certain embodiment of the Text-SQL API Delete function, as shown in FIGS. 6A and 6B, is generally denoted by reference numeral 600. Once executed, the delete function assigns a depth equal to the number of dots in the parameter and identifies the data store to be accessed (step 602). When the depth=0, the function returns (step 604). When the depth >0, the function selects the Table value by the key in the parameter (step 606). The function searches the data store and returns if the table is not found (step 608). If the table is found and the depth=1, the function sets the table="" to delete the table value, stores the table, and returns (step 610). If the table is found, but the depth >1, the table is split into rows by the delimiter "&" (step 612). The function then loops through the rows looking for the requested RowId with each row being split into field name value pairs by the delimiter ":" (step 614). If the row is not found, the function returns (step 616). If the row is found and the depth=2, the function sets the row value to ' ' (deletes the row value), joins the rows into a table with delimiter "&", stores the table, and returns (step 618). When the depth >2, the field value pairs are split into field names and associated field values by the delimiter "=" (step 620). The function then loops through the field name value pairs searching for the requested field name (step 622). If the field name is not found the function returns (step 624). The depth is checked if the field name is found (step 626). If the depth=4, the field value is split into attributes by the delimiter "|" (step 628) and the function searches for the selected attribute (or position) (step 630). The function returns "undefined" if the position/attribute is not found (step 632). If the position/attribute is found, the attribute is replaced by ' ' and the attributes are joined as field value by the delimiter "|" (step 634). If the depth is not 4, the field value is replaced by ' ' (step 636). Field names and values are joined as field name value pairs by the delimiter "=", the field name value pairs are joined to the row with delimiter ":", the row is joined to the table with delimiter "&", the table is stored, and the function returns (step 638).

In certain embodiments, the number of reads can be reduced to 0. This is important for user options (for example). User options are accessed frequently and changed rarely. These values are assigned to DOM memory using the same dot-notation and provide the best of all worlds, persistent storage and quick access with no reads. Note: Persistent storage like HTML5 localStorage, sessionStorage, and Cookies are saved to disk in the browser and accessing these are called reads and writes. Storage to DOM memory is referred to as assignment. If the user changes an option, it is written to HTML5 localStorage for example and then assigned to DOM memory for faster access. The syntax for DOM memory may be dDOS.Options.Menu.mnuAutoClose for example, which returns the value for the behavior of the menus automatically closing on the event onmouseout.

The current invention may work in conjunction with the U.S. patent application Ser. No. 14/102,752, which is incorporated herein by reference.

Application

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program PIN embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program PIN embodied on a computer readable medium may be transmitted using any appropriate medium, including but not limited to wireless, wire-line, optical fiber cable, radio frequency, etc., or any suitable combination of the foregoing. Computer program PIN for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall there between.

Glossary of Claim Terms

Application Programming Interface: is a set of functions allowing the programmer to access an application's services using a programming language. An API provides the developer with an abstraction layer, which masks the complexity of accessing a system or an application by providing a set of standard functions for which parameters and values are all that are known.

Data Deleting Action: is any action resulting in deleting information in the Name/Value storage container.

Data Inserting Action: is any action resulting in inserting information in the Name/Value storage container.

Data Selecting Action: is any action resulting in retrieving information from the Name/Value storage container.

Data Updating Action: is any action resulting in updating information in the Name/Value storage container.

Delimiter: is a sequence of one or more characters used to specify the boundary between separate, independent regions in plain text or other data streams.

Name/Value Storage Container: is a storage container having "Keys" or "Names" related to specific values.

Persistent Name/Value Storage Container: is a Name/Value pair storage container that outlives the process that created the data stored in the container.

Property of a Graphic User Interface: is any property making up the user interface that allows users to interact with electronic devices through graphical icons and visual indicators.

Syntax: is the structural organization of the functions. In computer science, the syntax of a computer language is the set of rules that defines the combinations of symbols that are considered to be a correctly structured document or fragment in that language.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A non-transitory computer readable storage media having computer-executable instructions, when executed by a processor, performing a method for storing, retrieving, and updating data of a visual graphic user interface on a web browser, the instructions comprising:

establishing a data connection between a web browser client and a remote web server;

receiving default data from the remote web server, by the web browser client;

monitoring properties of one or more windows as modified by an end user accessing the web browser client;

combining data, representing similar properties of the one or more windows, into data strings using a programming language, where the similar properties are predetermined and separated using delimiters;

combining the data strings into groups, wherein the groups are a predetermined set of related data strings;

maintaining, using group delimiters, an organized structure of the combined related data strings to keep the plurality of data strings individually accessible;

saving the groups of data strings as a single concatenated string;

storing the concatenated string in a persistent Name/Value storage container, where the name is a predetermined key representing the concatenated string and the value is the concatenated string; and generating an event by an end user wherein the event comprises of a data updating action, a data inserting action, a data deleting action, and a data selecting action;

responsive to the data updating action:
    accessing the Name/Value storage container containing some data to be updated;
    selecting the data from the concatenated string using simple dot-notation to parse the concatenated string;
    updating the data;
    saving the concatenated string with the updated data;
    storing the saved concatenated string in the Name/Value storage container;

responsive to the data inserting action:
    accessing the Name/Value storage container where some data is to be inserted;
    parsing the concatenated string using simple dot-notation;
    inserting the data;
    saving the concatenated string with the inserted data;
    storing the saved concatenated string in the Name/Value storage container;

responsive to the data deleting action:
    accessing the specified Name/Value storage container containing some data to be deleted;

selecting the data from the concatenated string using simple dot-notation to parse the concatenated string;
deleting the data;
saving the concatenated string without the deleted data;
storing the saved concatenated string in the Name/Value storage container;
responsive to the data selecting action:
accessing the specified Name/Value storage container containing some data to be retrieved;
parsing the concatenated string using simple dot-notation;
selecting the data from the concatenated string; and
returning the specific data.

2. The non-transitory computer readable storage media as in claim 1, further comprising:
responsive to a predetermined event, uploading the data to the web server, where the data is associated with an account authenticated by the end user.

3. The non-transitory computer readable storage media as in claim 1, further comprising:
using an application programming interface to encapsulate the programming language with functions using simple dot-notation declarative statements for performing particular operations.

4. The non-transitory computer readable storage media as in claim 3, further comprising:
the functions of the application programming interface including a select function, an insert function, an update function, and a delete function, where each function has the same syntax for any Name/Value storage container.

5. The non-transitory computer readable storage media as in claim 1, further comprising:
the programming language further including:
an attribute delimited text string with an assigned field name to relate the attribute delimited text string;
a field text string using delimiters separating the field values and field names;
a field delimited text string referred to as a row;
a single row delimited text string referred to as a table; and
an assigned name to relate the table string.

6. A computer-implemented method of storing, retrieving, and updating data of a visual graphic user interface on a web browser, the method comprising the steps of:
establishing a data connection between a web browser client and a remote web server, wherein the web browser client is a computer application on a computer device;
receiving default data from the remote web server, by the web browser client;
monitoring properties of one or more windows as modified by an end user accessing the web browser client;
combining data, representing similar properties of the one or more windows, into data strings using a programming language, where the similar properties are predetermined and separated using delimiters;
combining the data strings into groups, wherein the groups are a predetermined set of related data strings;
maintaining, using group delimiters, an organized structure of the combined related data strings to keep the plurality of data strings individually accessible;
saving the groups of data strings as a single concatenated string;
storing the concatenated string in a persistent Name/Value storage container, where the name is a predetermined key representing the concatenated string and the value is the concatenated string; and
generating an event by an end user wherein the event comprises of a data updating action, a data inserting action, a data deleting action, and a data selecting action;
responsive to the data updating action:
accessing the Name/Value storage container containing some data to be updated;
selecting the data from the concatenated string using simple dot-notation to parse the concatenated string;
updating the data;
saving the concatenated string with the updated data;
storing the saved concatenated string in the Name/Value storage container;
responsive to the data inserting action:
accessing the Name/Value storage container where some data is to be inserted;
parsing the concatenated string using simple dot-notation;
inserting the data;
saving the concatenated string with the inserted data;
storing the saved concatenated string in the Name/Value storage container;
responsive to the data deleting action:
accessing the specified Name/Value storage container containing some data to be deleted;
selecting the data from the concatenated string using simple dot-notation to parse the concatenated string;
deleting the data;
saving the concatenated string without the deleted data;
storing the saved concatenated string in the Name/Value storage container;
responsive to the data selecting action:
accessing the specified Name/Value storage container containing some data to be retrieved;
parsing the concatenated string using simple dot-notation;
selecting the data from the concatenated string; and
returning the specific data.

7. The computer-implemented method as in claim 6, further comprising:
responsive to a predetermined event, uploading the data to the web server, where the data is associated with an account authenticated by the end user.

8. The computer-implemented method as in claim 6, further comprising:
using an application programming interface to encapsulate the programming language with functions using simple dot-notation declarative statements for performing particular operations.

9. The computer-implemented method as in claim 8, further comprising:
the functions of the application programming interface including a select function, an insert function, an update function, and a delete function, where each function has the same syntax for any Name/Value storage container.

10. The computer-implemented method as in claim 6, further comprising:
the programming language further including:
an attribute delimited text string with an assigned field name to relate the attribute delimited text string;
a field text string using delimiters separating the field values and field names;
a field delimited text string referred to as a row;
a single row delimited text string referred to as a table; and
an assigned name to relate the table string.

11. A non-transitory computer readable storage media having computer-executable instructions, when executed by a processor, performing a method for storing, retrieving, and updating data of a graphic user interface on a web browser, the instructions comprising establishing a data connection between a web browser client and a remote web server;
    receiving one or more graphic user interfaces from the remote web server, by the web browser client;
    monitoring properties of the one or more graphic user interfaces as modified by an end user accessing the web browser client;
    combining data, representing similar properties of the one more graphic user interfaces, into data strings using a programming language, where the similar properties are predetermined and separated using delimiters;
    combining the data strings into groups, wherein the groups are a predetermined set of related data strings;
    maintaining, using group delimiters, an organized structure of the combined related data strings to keep the plurality of data strings individually accessible;
    saving the groups of data strings as a single concatenated string;
    storing the concatenated string in a persistent Name/Value storage container, where the name is a predetermined key representing the concatenated string and the value is the concatenated string;
    generating an event by an end user wherein the event comprises of a data updating action, a data inserting action, a data deleting action, and a data selecting action;
    responsive to the data updating action:
        accessing the Name/Value storage container containing the properties to be updated;
        selecting the properties from the concatenated string, using simple dot-notation to parse the concatenated string;
        updating the properties;
        saving the concatenated string with the updated properties; and
        storing the saved concatenated string in the Name/Value storage container;
    responsive to the data deleting action:
        accessing the specified Name/Value storage container containing the properties to be deleted;
        selecting the properties from the concatenated string, using simple dot-notation to parse the concatenated string;
        deleting the properties;
        saving the concatenated string without the deleted properties;
        storing the saved concatenated string in the Name/Value storage container;
    responsive to the data retrieving action:
        accessing the specified Name/Value storage container containing the properties to be retrieved;
        selecting the properties from the concatenated string, using simple dot-notation to parse the concatenated string;
        returning the specific properties; and
    responsive to a predetermined event, uploading the properties to the web server, where the properties are associated with an account authenticated by the end user.

12. The non-transitory computer readable storage media of claim 11, further comprising an application programming interface to encapsulate the programming language with functions using simple dot-notation declarative statements for performing particular operations, the functions of the application programming interface further including a select function, an insert function, an update function, and a delete function, where each function has the same syntax for any Name/Value storage container.

\* \* \* \* \*